April 21, 1970  G. C. HARMS ET AL  3,507,107
PORTABLE FRUIT PICKER

Filed Jan. 25, 1968  2 Sheets-Sheet 1

INVENTORS
GEORGE C. HARMS and
JOHN B. McCUTCHEON

BY A. Yates Dowell &
A. Yates Dowell Jr.
ATTORNEYS

April 21, 1970   G. C. HARMS ET AL   3,507,107
PORTABLE FRUIT PICKER
Filed Jan. 25, 1968   2 Sheets-Sheet 2
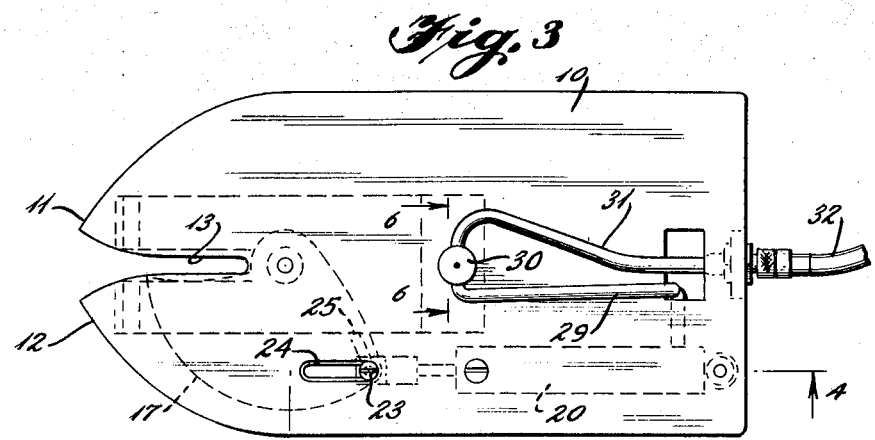
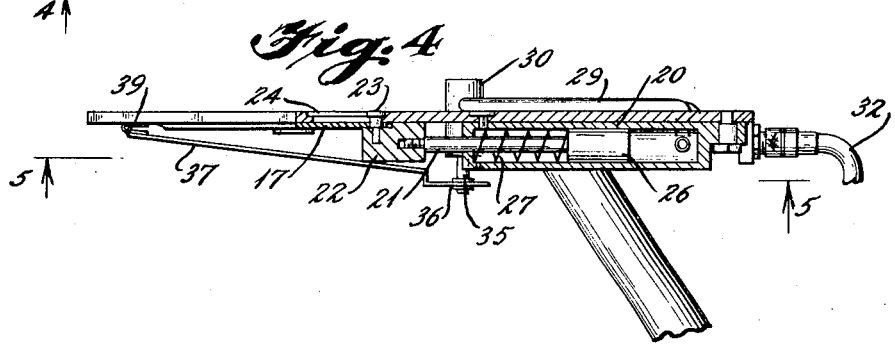
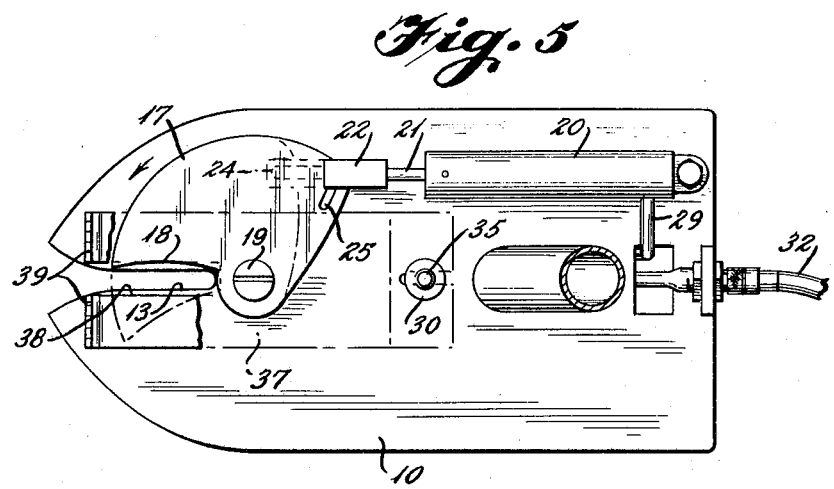
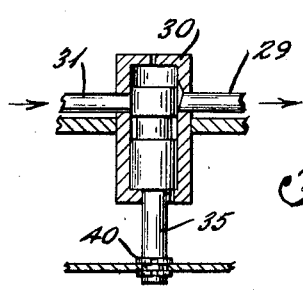
INVENTORS
GEORGE C. HARMS and
JOHN B. McCUTCHEON
BY *A. Yates Dowell*
*A. Yates Dowell Jr.*
ATTORNEYS United States Patent Office 3,507,107
Patented Apr. 21, 1970

3,507,107
PORTABLE FRUIT PICKER
George C. Harms, 809 Munn Ave., and John B. McCutcheon, 1033 Marjorie St., both of Lakeland, Fla. 33801
Filed Jan. 25, 1968, Ser. No. 700,583
Int. Cl. A01g 19/08
U.S. Cl. 56—336                                     3 Claims

ABSTRACT OF THE DISCLOSURE

A combination fruit picker with a delivery tube and a support by which the device can be held and moved into contact one after another with fruit hanging on a tree to detach the fruit from the supporting stems and allow it to gravitate with interrupted motion, without injury, to a receptacle or selected area. The picker includes a cutting knife operated by electric or other power means, as for example by a cylinder and piston controlled by contact of the picker with the fruit, and upon completion of the cutting action the device is instantaneously reset.

BACKGROUND OF THE INVENTION

Field of the invention

The invention relates to fruit pickers or devices for harvesting fruit hanging from the limbs of trees and much of which fruit is not easily accessible but is out of reach of a person standing on the ground.

Description of the prior art

Fruit pickers heretofore produced have been unsatisfactory for various reasons, including unwieldiness, excess bulk, weight and cost, and because they were impractical and required too much effort and physical dexterity in the use of the same.

SUMMARY OF THE INVENTION

The invention is a portable fruit picker and has for its object to provide a relatively simple, lightweight device including a knife for severing close to the fruit the stems of fruit hanging on a tree with the severing action directly caused by the knife coming in contact with the fruit. A delivery tube is provided having webs or baffles for causing the fruit to fall, without being bruised or otherwise injured, into a receptacle or at a predetermined area. Also the knife may be mounted on a pole along which power from a source can be supplied for performing the cutting operation.

BRIEF DESCRIPTION OF THE DRAWINGS

Other objects and advantages of the invention will be apparent from the following description considered in connection with the accompanying drawings wherein:

FIG. 3, an enlarged top plan view thereof;

FIG. 4, a longitudinal section on the line 4—4 of FIG. 3;

FIG. 5, a bottom plan view on the line 5—5 of FIG. 4; and,

FIG. 6, an enlarged longitudinal section through a valve adapted to be opened to admit pressure fluid to actuate the knife when contact is made with the fruit.

DESCRIPTION OF THE PREFERRED EMBODIMENT

Figure 1:
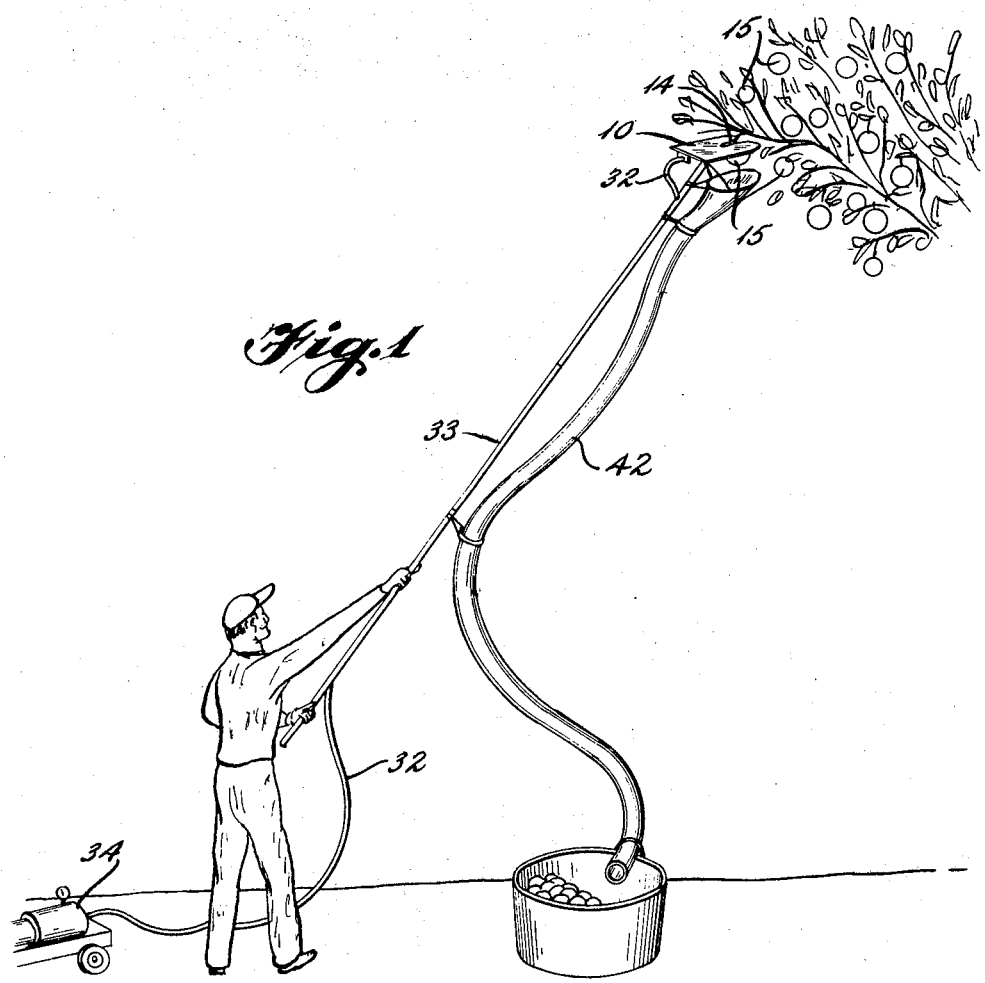
FIG. 1 is an illustration of the device of the present invention and the manner of its use.
Figure 2:
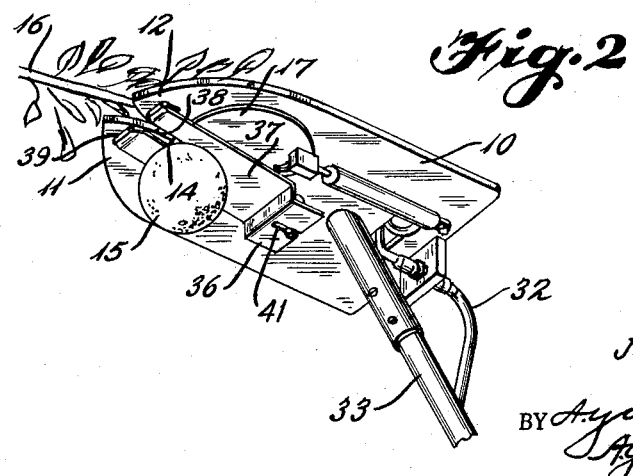
FIG. 2, an enlarged bottom perspective of the fruit detaching knife and associated mechanism.

With continued reference to the drawings, a relatively lightweight plate or body 10 is provided of generally rectangular configuration but with one end extended into a pair of spaced tips or peaks 11 and 12 between which is located a slot 13 of a size to receive a stem 14 of citrus or other fruit 15 hanging from a limb 16 of a tree on which such fruit is grown. In order to detach the fruit 15 means is provided for cutting the stems 14, which means includes a knife 17 having a cutting edge 18 normally located at one side of the slot 13 but adapted to move across the slot and cut a stem located therein.

The knife or cutting blade 17 is attached to or mounted by means of a screw pivot 19 on the plate 10 so that when the knife is rotated on such screw pivot it will cut a stem in the slot 13. Power may be provided for actuating the knife 17 in any desired manner as for example by means of hydraulic cylinder 20 having a piston rod 21 threaded or otherwise connected to a head 22, carrying a crank pin 23, having a head portion which rides in a slot 24 in the plate 10, and a body portion which rides in a slot 25 in the knife 17. When the crank pin 23 is reciprocated by the piston rod 21 attached to the piston 26 against the action of the return spring 27, the head of the screw 23 will move lengthwise of the slot 24, thus causing the knife 17 to be rotated about the screw pivot 19, the body of the pin traveling in the slot 25 in the knife or blade 17.

Fluid, whether air or liquid or a combination of the two, may be supplied to the cylinder 20 through the line 29, control valve 30, and feed line 31, from a supply line 32, carried inside a supporting pole 33, and extending to a compressor or other source of supply 34. The supporting pole may be composed of telescopic sections.

In order to cause the valve 30 to open, a projecting stem 35 extends downwardly and is engaged by a flat portion 36 of an actuator plate 37 also provided with a slot 38 registering with the slot 13 of the plate 10 to permit the stem of the fruit to extend therethrough. The actuator plate is mounted by means of a pivot or hinge 39 and is limited in its movement by means of lock rings or washers 40 disposed about and in grooves in the valve stem 35 on opposite sides of the plate. The flat portion 36 of the plate 37 has an elongated slot 41 therein in which the stem 35 can move. As the actuator plate 37 engages the fruit it is caused to pivot about the hinge 39 to produce endwise movement of the valve stem 35, thus opening the valve to allow the knife to be operated by the piston 26 in the cylinder 20. The spring 27 serves to retract the knife. Upon completion of the cutting action the knife will be retracted and reset instantaneously, ready for the next cutting operation. It will be apparent that the construction of the device cuts the stem of the fruit in a manner to leave as little of the stem on the fruit as possible.

In the use of the fruit picker of the present invention the support pole may be adjusted in length to locate the knife at any desired picking height and the pole may be made from lightweight material such as aluminum, plasterglass or other substance. Also the knife may have a plain or serrated edge. The detached or picked fruit may pass by gravity through the delivery tube 42 to a field box, truck body, or designated area, and if desired in order to cushion the fall of the fruit and avoid damage thereto, the delivery tube may be provided with transverse webs or baffles not shown.

It will be apparent that the device may be operated by an individual and when applied over the stem of a piece of fruit therefore trapping the fruit by its stem and the cutting device moved downwardly on the captured fruit, such movement will cause contact between the fruit and the plate 37 therefore automatically triggering the action of the cutter to sever the fruit from the trapped stem.

It will be obvious from the foregoing that a simple practical fruit picker is provided by which the fruit may be picked with greater ease and speed, and with less effort.

We claim:

1. A fruit picker comprising a relatively thin body having a slot in which the stem of the fruit to be picked is received, knife means mounted on said body in a manner to move transversely of said slot and sever the stem therein on which fruit is supported, power means mounted on said body for moving said knife across said slot to perform the cutting operation, and control means operable upon contact of said picker with the fruit for actuating the movement of said knife, said control means including actuator means having portions spaced from said body and adapted to energize said power means when said actuator means is moved toward said body by the fruit.

2. The structure of claim 1 in which the power means for the knife is a cylinder and piston, and resetting means in the form of a spring element.

3. A portable fruit picker comprising a body having a slot into which the stem of fruit to be picked is received, knife means carried by said body, power means supported by said body for moving said knife means across said slot to sever the stem of fruit received therein, trigger means supported by said body and operatively associated with said power means, said trigger means being engageable by the fruit carried on the stem within said slot for causing said power means to move; said knife across said slot and cut the stem of the fruit when said trigger means is moved toward said body by a pull against said fruit, means on said body for supporting said picker at the desired fruit severing elevation and conveying means carried by said supporting means for receiving the severed fruit, cushioning the fall thereof and delivering it to a predetermined area.

References Cited

UNITED STATES PATENTS

| | | | |
|---|---|---|---|
| 66,517 | 7/1867 | Page | 56—335 |
| 1,109,645 | 9/1914 | Slatton | 56—338 |
| 1,191,954 | 7/1916 | Elkins | 56—336 |
| 2,661,587 | 12/1953 | Bullock | 56—334 |
| 2,746,232 | 5/1956 | Ossino | 56—336 |
| 2,990,669 | 7/1961 | Klemm | 56—334 |
| 3,165,880 | 1/1965 | Buie | 56—336 |

RUSSELL R. KINSEY, Primary Examiner